United States Patent [19]

Meek

[11] Patent Number: 4,502,212

[45] Date of Patent: Mar. 5, 1985

[54] APPARATUS FOR INSTALLATION AND REMOVAL OF DRILL DEPTH RINGS

[75] Inventor: Larry N. Meek, Lyons, Colo.

[73] Assignee: Indian Valley Company, Inc., Lyons, Colo.

[21] Appl. No.: 348,662

[22] Filed: Feb. 12, 1982

[51] Int. Cl.³ .................. B23P 21/00; B23Q 15/00
[52] U.S. Cl. ............................... 29/721; 29/720; 29/525; 29/267; 29/426.5; 76/101 R; 33/169 B
[58] Field of Search .............. 29/229, 267, , 450, 29/525, 720, 721, 705, 426.5, 426.6; 76/101 R; 33/169 B

[56] References Cited

U.S. PATENT DOCUMENTS 2,904,955  9/1959  Kreiter ............................ 29/267
3,334,405  8/1967  Cann et al. ................. 29/426.5 X
3,813,756  6/1974  Rigsby et al. ................. 29/267 X Primary Examiner—Charlie T. Moon
Assistant Examiner—Ronald S. Wallace
Attorney, Agent, or Firm—William E. Hein

[57] ABSTRACT

Apparatus for quickly and precisely installing depth rings on drills and for removing previously installed depth rings includes a base member on which are mounted one or more installation and removal mechanisms, each of the installation and removal mechanisms comprising a lever actuated push rod for moving a drill with respect to a retained depth ring, each of the installation mechanisms additionally comprising a dial indicator for accurately indicating the position of the depth ring with respect to the point of the drill on which it is being installed.

5 Claims, 2 Drawing Figures

APPARATUS FOR INSTALLATION AND REMOVAL OF DRILL DEPTH RINGS

BACKGROUND AND SUMMARY OF THE INVENTION

This invention relates generally to drills and more specifically to an apparatus for precisely installing a plastic depth ring over the shank of a drill.

Manufacturers of electronic equipment routinely employ solid carbide drills for drilling holes in printed circuit boards used in connection with electronic circuits. These drills are typically 1½" in length and have various flute diameters but a common ⅛" shank diameter. Drills having flute diameter sizes from #80 (0.0135") through #31 (0.1200") are generally referred to as small drills, while those having flute diameters of ⅛" through ¼" are generally referred to as large drills.

Prior to using such drills in circuit board drilling operations it is necessary to press a plastic depth ring over the shank of each drill at a critically specified distance from the drill point. The depth ring determines the depth to which a given hole will be drilled in a circuit board by the automatic drilling machines in which the ringed drills are used. Due to the high speeds at which such drills are operated, it is necessary to sharpen them at frequent intervals. In order to sharpen these drills the plastic depth rings must first be removed.

It has been observed that prior art methods employed in the installation and removal of the depth rings from such drills have resulted in damage to the drill points. This damage is typically manifested as chipping or breaking and significantly shortens the life of a drill. In addition, damage done to a newly sharpened drill during the installation of a plastic depth ring renders that drill all but useless for drilling operations until it has been resharpened. Oftentimes, damage to a drill will go undetected for a period of time, resulting in poor hole quality and a high percentage of scrap circuit boards.

A further disadvantage of prior art methods for installing plastic depth rings is the associated loose tolerance to which the rings are installed. In the event the depth ring is installed too far from the drill point, the drill will likely be damaged by contacting the steel table of the drilling machine during drilling operations.

It is therefore the principal object of the present invention to provide an apparatus for quickly and precisely installing depth rings on drills without thereby damaging any cutting edges of the drills and for similarly quickly removing those depth rings, again without thereby causing damage to the drills.

This and other incidental objects are accomplished in accordance with the illustrated preferred embodiment of the present invention by providing a base plate on which are mounted a pair of installation mechanisms for installing depth rings on both small and large drills, respectively, and a removal mechanism for removing depth rings from drills on which they have been previously installed. Each of the setting mechanisms includes a dial indicator for very accurately positioning the depth rings as they are being installed on the drills.

DESCRIPTION OF THE PREFERRED EMBODIMENT

Figure 1:
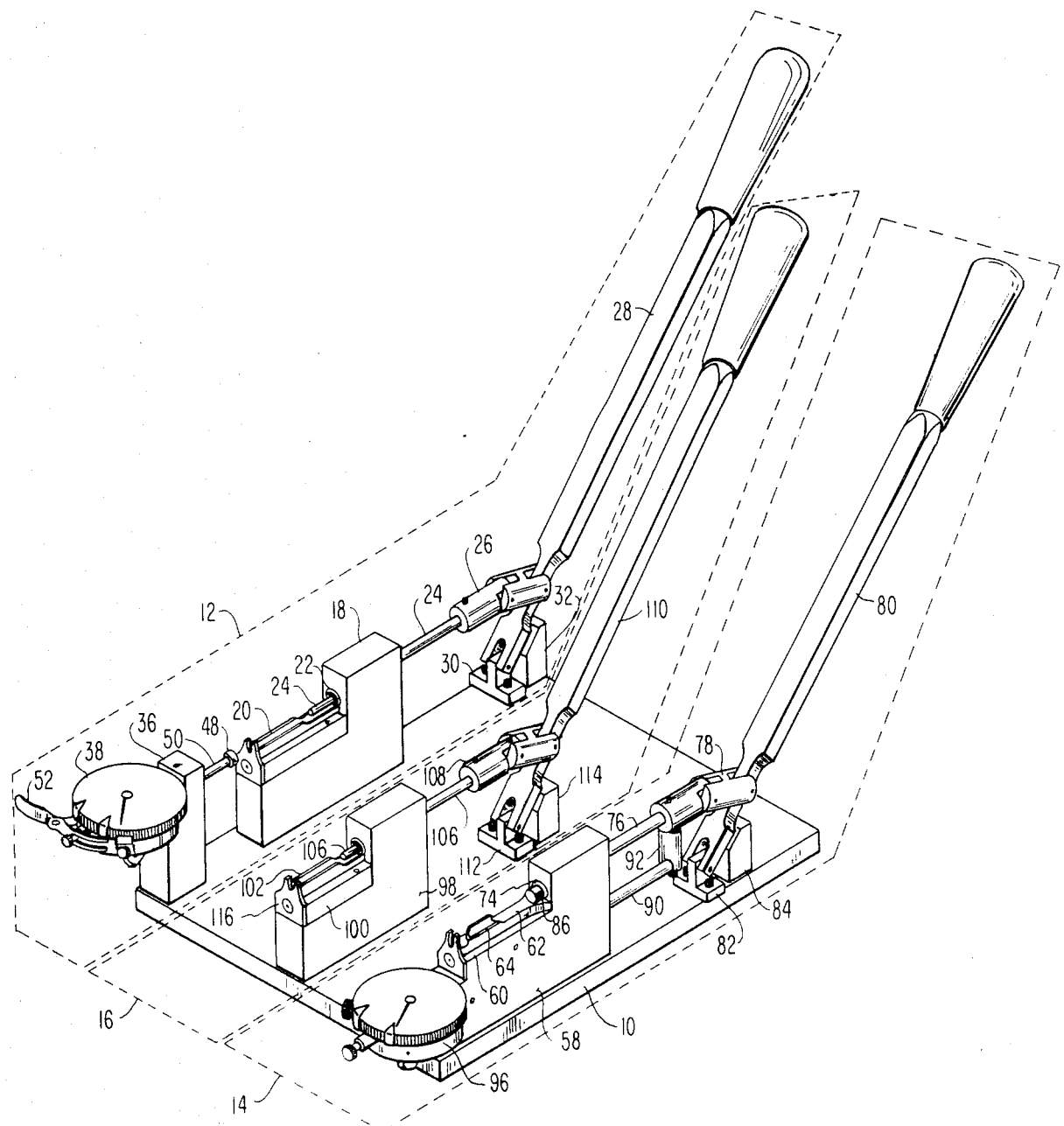
FIG. 1 is an isometric drawing of the apparatus of the present invention.
Figure 2:
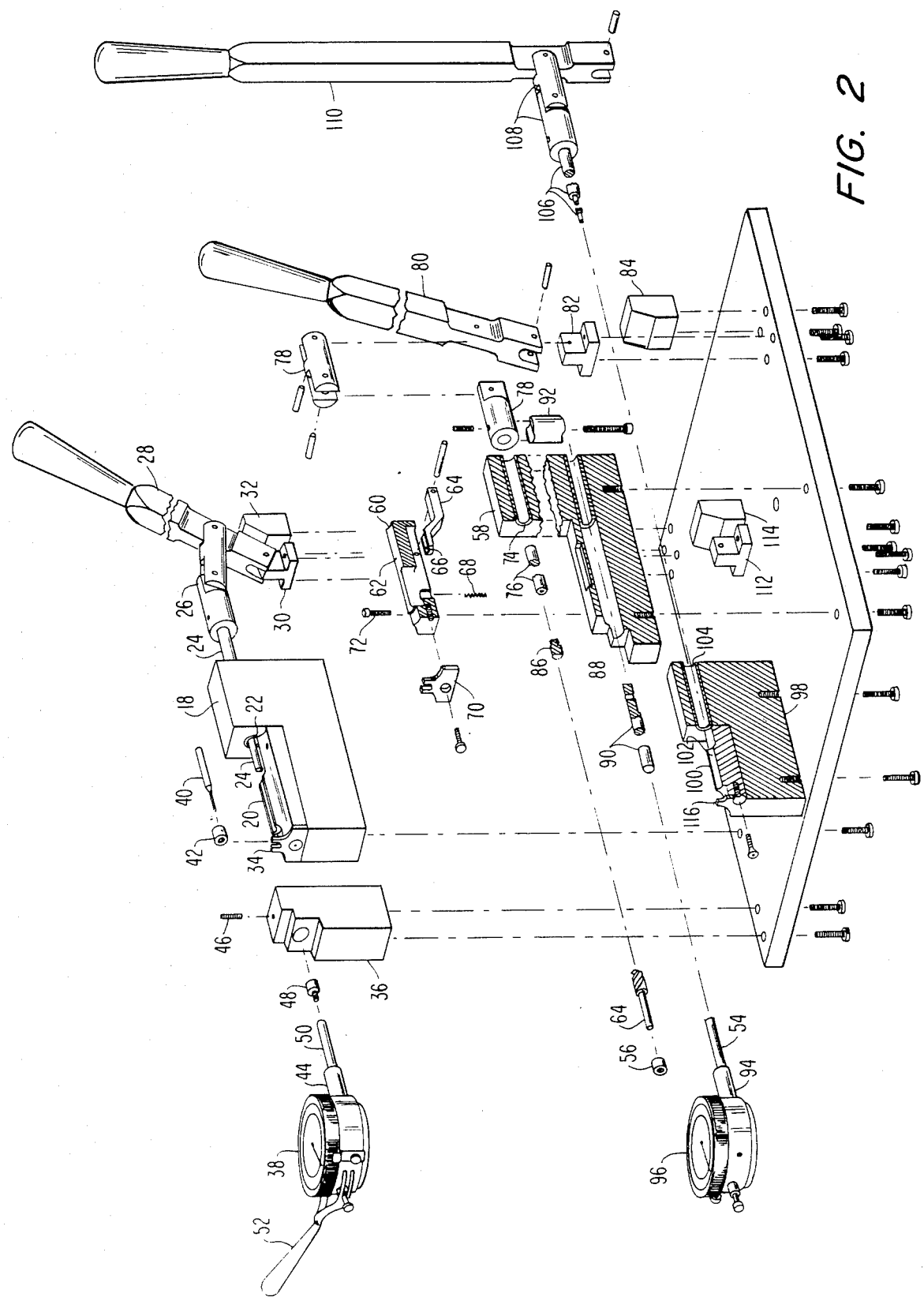
FIG. 2 is an exploded, partially sectioned view of the apparatus of FIG. 1.

Referring now to FIGS. 1 and 2, there is shown a base plate 10 upon which are mounted a pair of lever actuated depth ring installation mechanisms and a single lever actuated depth ring removal mechanism. For ease of operation, base plate 10 may be mounted to a bench, table or other solid work surface. A pair of installation mechanisms 12 and 14 are mounted on base plate 10 for the purpose of installing depth rings on small and large drills, respectively. A removal mechanism 16 is similarly mounted on base plate 10 for removing previously installed depth rings from various sizes of drills.

Installation mechanism 12 comprises a body member 18 that is attached to base plate 10. Body member 18 includes a drill support guide 20 that comprises a generally semicircular groove in which a drill 40 is placed prior to the installation of a cylindrical depth ring 42 thereon. Body member 18 further includes a cylindrical cavity 22 within which a push rod 24 is positioned for slidable motion. Push rod 24 is coupled, via a conventional universal coupler assembly 26, to a handle 28. Handle 28 is hingedly attached to a handle mounting bracket 30, which is in turn secured to base plate 10. A handle stop 32, associated with handle 28 to stop the return stroke thereof, is attached to base plate 10 adjacent handle mounting bracket 30. A ring stop member 34 is attached at the end of body member 18 away from push rod 24. A semicircular groove at the top edge of ring stop member 34 is axially aligned with the semicircular groove on top of drill support guide 20. The grooved top edge of ring stop member 34 is spaced away from one end of drill support guide 20 to accommodate depth ring 42 such that depth ring 42, drill 40, and push rod 24 are in substantial axial alignment with each other. An indicator block 36 is mounted to base plate 10 adjacent body member 18. Indicator block 36 has a hole therethrough in axial alignment with push rod 24 for receiving a mounting stem 44 of a conventional dial indicator 38 of the type manufactured by Ussa Corporation and having a one inch travel. Dial indicator 38 is secured within indicator block 36 by means of a set screw 46 applied against mounting stem 44. A threaded brass tip 48 is screwed into a protruding end of an actuator rod 50 of dial indicator 38 to provide a soft metal surface for contacting the tip of drill 40 when depth ring 42 is installed thereon. Use of brass tip 48 prevents chipping damage to the point of drill 40 during the depth ring installation procedure.

In operation, installation mechanism 12 is employed to install depth rings on small drills (#80 through #31) by first placing a depth ring 42 in position behind ring stop 34 and by then placing a drill 40 in the semicircular groove of drill support guide 20. As handle 28 is advanced toward dial indicator 38, push rod 24 will contact the shank end of drill 40 and will push the tip of drill 40 through depth ring 42 and into contact with brass tip 48 at the end of actuator rod 50 of dial indicator 38. Further advancement of handle 28 will push drill 40 further through depth ring 42 and will produce travel of actuator rod 50 of dial indicator 38. Advancement of handle 28 is stopped when the desired indication has been reached on dial indicator 38 to advise the user that depth ring 42 has been precisely positioned on the shank of drill 40 at the desired distance from the tip thereof. The handle 28 is next returned to its initial position at rest against handle stop 32. A release lever 52 on dial indicator 38 is then actuated to clear actuator rod 50 and brass tip 48 from the tip of drill 40. Drill 40, with depth ring 42 now precisely in place, is carefully removed from drill support guide 20.

A second installation mechanism 14, very similar in construction and operation to that of installation mechanism 12 described above, is also mounted on base plate 10. Installation mechanism 14 comprises a body member 58 that is secured to base plate 10 by a plurality of bolts inserted from the under side thereof, for example, as illustrated in FIG. 2. Body member 58 includes a drill support guide 60 that further includes a generally semicircular groove 62 in which a large drill 65 (⅛ inch diameter through ¼ inch diameter) is placed prior to installation of a cylindrical depth ring 42 thereon. A drill support guide insert 64 is hingedly attached within a cavity in drill support guide 60 such that a support groove portion 66 of insert 64 receives the shank of drill 65 for the purpose of maintaining horizontal alignment of the shank of drill 65 with depth ring 56. Support groove portion 66 of insert 64 is maintained in a biased position by a spring 68 so as to hold drill 65 in a horizontal position. A ring stop member 70 like ring stop member 34 associated with installation mechanism 12 is attached at the end of drill support guide 60. Drill support guide 60 is attached to body member 58 by means of a screw 72. Body member 58 includes a first cylindrical cavity 74 within which a push rod 76 is positioned for slidable motion. Push rod 76 is coupled, via a conventional universal coupler assembly 78, to a handle 80 that is like handle 28 of installation mechanism 12. Handle 80 is hingedly attached to a handle mounting bracket 82, which is in turn secured to base plate 10. A handle stop 84, associated with handle 80 to stop the return stroke thereof, is likewise attached to base plate 10 adjacent handle mounting bracket 82.

A threaded brass tip 86 is screwed into the end of push rod 76 away from handle 80 to provide a soft metal surface for contacting the tip of drill 64 when depth ring 56 is installed thereon, the same function as provided by brass tip 48 described above. A second cylindrical cavity 88, axially parallel to and below first cylindrical cavity 74, is provided within body member 58. An indicator rod 90 is positioned within cylindrical cavity 88 for slidable motion therethrough. The end of indicator rod 90 proximate to handle 80 is coupled to universal coupler assembly 78 by way of a rod connector 92 so that push rod 76 and indicator rod 90 move in concert whenever handle 80 is advanced. Body member 58 is adapted for receiving, at the end of cylindrical cavity 88 away from handle 80, a mounting stem 94 of a dial indicator 96 that may be of the same type as dial indicator 38 described above. Mounting stem 94 of dial indicator 96 may be held in place within body member 58 by means similar to that provided by set screw 46 in indicator block 36. A protruding end of an actuator rod 54 of dial indicator 96 is in contact with indicator rod 90 so that motion of indicator rod 90 produced by advancing handle 80 will be recorded on dial indicator 96.

Operation of installation mechanism 14 to install depth rings on large drills is very much like the procedure described above in connection with installation mechanism 12 for small drills. First, a depth ring to be installed is placed into position behind ring stop 70 and the tip end of a drill 65 is placed against brass tip 86 and in the semicircular groove 62 of drill support guide 60 with the shank of drill 65 resting on the support groove portion 66 of drill support guide insert 64. As handle 80 is advanced toward dial indicator 96, push rod 76 will push the shank of drill 65 through depth ring 56 and at the same time will produce travel of indicator rod 90 and, hence, travel of actuator rod 54 to produce a reading on dial indicator 96 that advises the user of the position of depth ring 56 with respect to the tip of drill 65. Advancement of handle 80 is stopped when a specific indication on dial indicator 96 has been reached, thus advising the user that depth ring 56 has been precisely positioned on the shank of drill 65 at the desired distance from the tip thereof. Handle 80 is then returned to its initial position at rest against handle stop 84. Drill 65, with depth ring 56 now precisely in place, is carefully removed from drill support guide 60.

A removal mechanism 16 for removing depth rings that have been previously installed on drills without injuring the drill points is also provided on base plate 10. Removal mechanism 16 is constructed identically to installation mechansim 12 except that it is not necessary to provide the dial indicator 38 and associated indicator block 36 of installation mechanism 12. A body member 98 that may be fabricated as a duplicate of body member 18 of installation mechanism 12 is similarly securely attached to base plate 10. Body member 98 includes a drill support guide 100 that further includes a semicircular groove 102 within which a drill having a previously installed depth ring is placed prior to removal of the depth ring. Body member 98 also includes a cylindrical cavity 104 within which a push rod 106 is positioned for slidable motion. Push rod 106 is coupled, via a conventional universal coupler assembly 108, to a handle 110. Handle 110 is hingedly attached to a handle mounting bracket 112, which is in turn secured to base plate 10. A handle stop 114, associated with handle 110 to stop the return stroke thereof, is attached to base plate 10 adjacent handle mounting bracket 112. A ring stop member 116 is attached at the end of body member 98 away from push rod 106. A semicircular groove at the top edge of ring stop member 116 is axially aligned with semicircular groove 102 in drill support guide 100.

In operation, removal mechanism 16 is employed to remove a depth ring previously installed on either a small or large drill by placing the drill in position in the semicircular groove 102 of drill support guide 100 such that the depth ring is behind ring stop 116 and the point of the drill is away from handle 110. As handle 110 is advanced, push rod 106 contacts the shank of the drill and pushes it through the depth ring that is retained behind ring stop 116. Handle 110 is then returned to its initial position at rest against handle stop 114.

While the apparatus of the present invention may be fabricated using any of a number of available materials, tool steel has been found to be an ideal material from which to fabricate the major components described above due to considerations involving the desired high accuracy of the installation mechanisms 12 and 14 as well overall reliability and mechanical rigidity of the apparatus. The cylindrical cavities within body members 18, 58, and 98 in which push rods 24, 76, and 106, as well as actuator rod 90, operate are preferbably bushed with oil lite bronze bushings.

I claim:

1. Depth ring installation apparatus including a mechanism for precisely installing a depth ring on the shank of a drill a specified distance from the tip of the drill, the mechanism comprising:

a base member;

a body member connected to the base member, the body member including drill guide means for supporting a drill in position for translational motion along the axis of the drill, and depth ring support and retention means for retaining the depth ring in a fixed position proximate to one end of the drill and in substantial axial alignment with the drill, the body member further including push rod means positioned for translational motion in substantial axial alignment with the depth ring and the drill;

lever means connected to the base member and coupled to the push rod means for applying the push rod means against the end of the drill distal to the depth ring, whereby the drill is urged partially through the depth ring; and indicator means coupled to the body member, the indicator means being responsive to actuation of the lever means urging the drill through the depth ring for measuring and indicating the position of the depth ring with respect to the tip of the drill.

2. Apparatus as in claim 1 wherein said mechanism is operative for installing a depth ring on a drill within a first size range, the apparatus further comprising an additional mechanism for installing a depth ring on a drill within a second size range different from the first size range.

3. Apparatus as in claim 1 wherein said mechanism is operative for installing a depth ring on a drill having a shank diameter less than or equal to the flute diameter thereof, said apparatus further comprising a second mechanism for installing a depth ring on a drill having a shank diameter greater than the flute diameter thereof.

4. Apparatus as in claims 1, 2, or 3 further comprising a removal mechanism for removing a previously installed depth ring from a drill.

5. Apparatus as in claim 4 wherein said removal mechanism comprises:

a body member connected to the base member, the body member including drill guide means for supporting a drill in position for translational motion along the axis of the drill, the body member further including depth ring stop means for preventing motion of the depth ring in concert with translational motion of the drill, the body member further including push rod means positioned for translational motion in substantial axial alignment with the drill; and lever means connected to the base member and coupled to the push rod means for applying the push rod means against one end of the drill, whereby the drill is urged completely through the depth ring.

* * * * *